May 25, 1965 R. C. SMART 3,185,410

VERTICAL LIFT AIRCRAFT

Filed Oct. 21, 1963 2 Sheets-Sheet 1

INVENTOR
Raymond C. Smart

May 25, 1965 R. C. SMART 3,185,410
VERTICAL LIFT AIRCRAFT
Filed Oct. 21, 1963 2 Sheets-Sheet 2
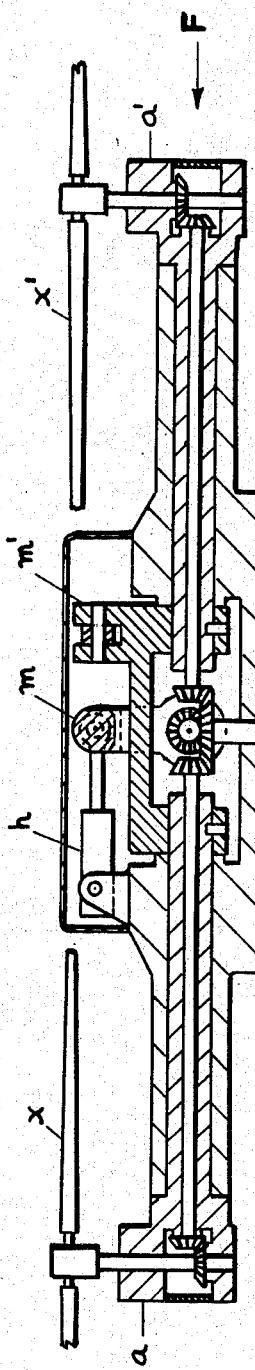
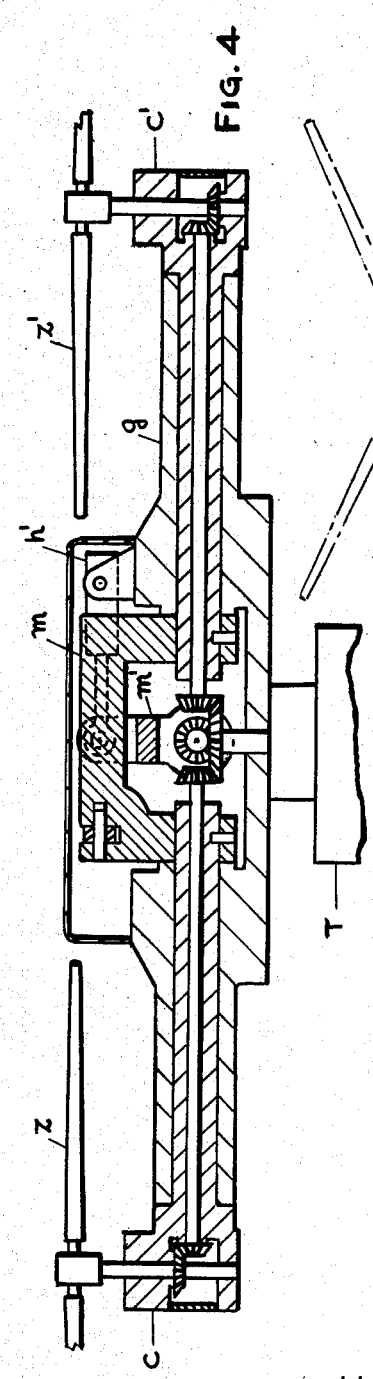
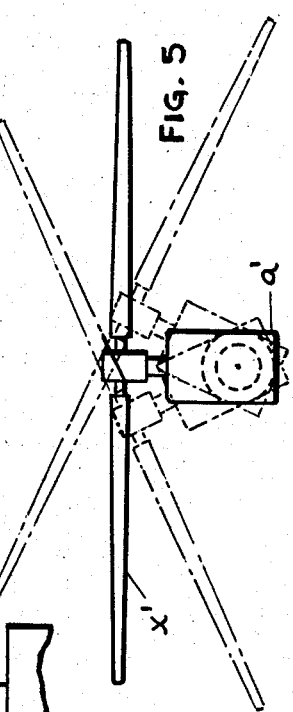
INVENTOR
Raymond C. Smart

3,185,410
VERTICAL LIFT AIRCRAFT
Raymond C. Smart, Penfield, N.Y.
(1110 Cold Springs Road, Liverpool, N.Y.)
Filed Oct. 21, 1963, Ser. No. 318,482
1 Claim. (Cl. 244—17.23)

This invention relates to vertical lift aircraft. In particular to new and novel vertical lift aircraft, capable of directional flight, hovering and maneuvering for spot landing.

In accordance with the above, an object of the invention is to provide a new and novel four rotor vertical lift aircraft. In order to achieve this object there is herein disclosed a four rotor vertical lift aircraft, incorporating a simple and unique diagonal construction arrangement, and pivoting, of the rotor housing units, whereby exceptional controlability, maneuverability and stability is achieved.

Another object of the invention is to provide a four rotor vertical lift aircraft with ideal weight distribution. This is accomplished, by constructing the passenger and pilot compartments on a circle around a central housing that encloses the drive motor, reduction gear unit, clutch unit, etc.

Another object of the invention is to provide a four rotor vertical lift aircraft, with rotors that have fixed blade pitch. The invention comprises means, whereby the conventional method of altering blade pitch with the rotors revolving, is not required for control of the four rotor vertical lift aircraft. With the rotor blade pitch fixed, and the blades not required to rotate about their longitudinal axes, a stronger, simpler, therefore safer rotor system results.

The invention will be readily understood from a reading of the following specification, and by reference to the accompanying drawings, wherein:

FIG. 3 is an enlarged partial cross section, taken in direction of the arrows E—E of FIG. 1.

FIG. 4 is an enlarged partial cross section, taken in direction of the arrows D—D of FIG. 1.

FIG. 5 is an end elevation view, taken in direction of arrow F of FIG. 3, showing the rotor and housing unit in vertical lift position and illustrating the movement of same.

Figure 1:
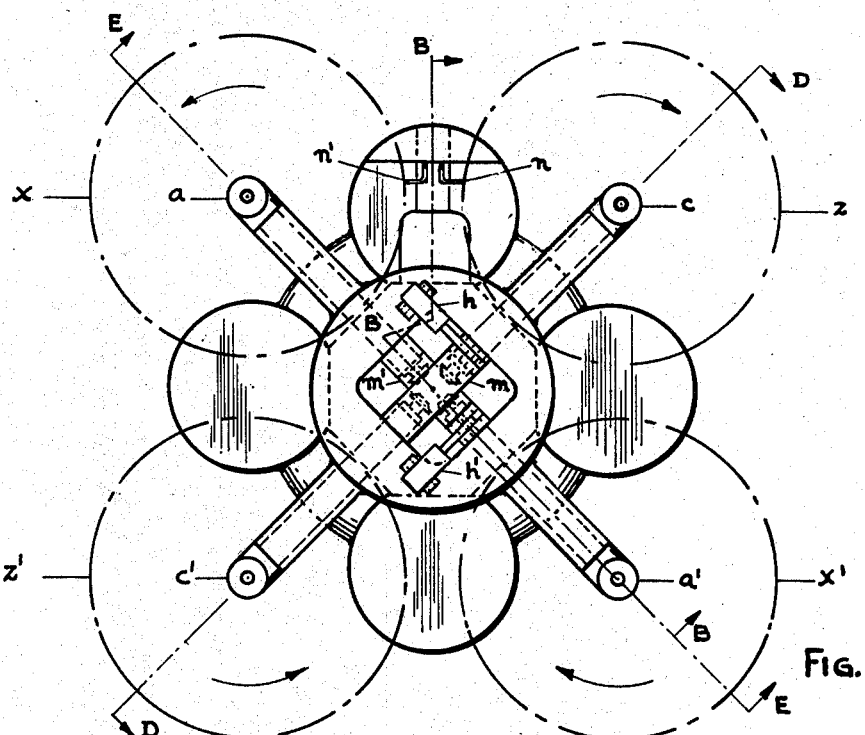
FIGURE 1 is a plan view of the four rotor vertical lift aircraft, with rotor housing units in the vertical lift position.
Figure 2:
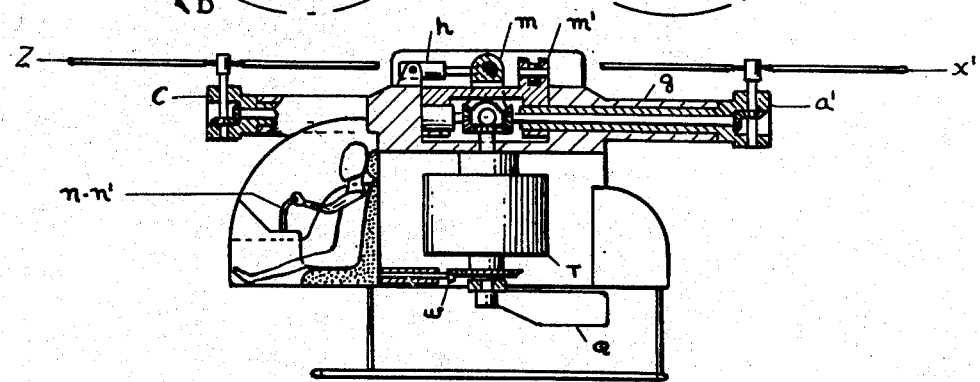
FIG. 2 is a partial cross section taken in the direction of the arrows B—B of FIG. 1.

Referring first to FIGURES 1 to 5 inclusive, relating to the four rotor vertical lift aircraft. In FIG. 1 there is shown a diagonal arrangement of four rotors, X–X' and Z–Z', mounted outboard from the center of the aircraft, with the direction of rotation designated by arrows, and the rotors shown in the vertical lift position. Also shown is the main body of the aircraft "g" with four extended arms for support of the rotor units. Around the center and outside the central housing enclosing the drive motor "T," reduction gear unit, clutch, etc., is constructed in the passenger and pilot compartment. In this view the top cover has been removed to show the mechanism more clearly.

Referring to FIG. 2, again the rotors are shown in the vertical lift position, and in this view may be seen the centralized construction of the aircraft. Also shown is the rudder or spin vane "Q" in the position for normal forward flight.

A better understanding of the rotor housing units, will be had by referring to FIGS. 3 and 4, keeping in mind that the rotor housing units are on the same plane. Referring to FIG. 3 first, this shows rotor pivot housings $a$–$a'$ in line with one another and extending through the arms of main body "g," and into a recess in main body "g," where they are joined and securely fastened to the yoke $m'$, that straddles the drive gears, this now becomes a rigid unit that may be rotated a certain degree in the main body "g." This rotation is controlled by a hydraulic cylinder "h'" and piston, with the cylinder "h'" mounted on a pivot fixed to the main body "g." The piston shaft end is pivotally secured to the extended arm on yoke $m'$. Hydraulically extending and retracting the piston will rotate the yoke $m'$, housings $a$–$a'$ and rotors $x$–$x'$ as a unit, forward and back as shown in FIG. 5 view F.

Referring to FIG. 4, this shows the rotor pivot housings $c$–$c'$ in line with one another, and extending through the arms of the main body "g," and into a recess in main body "g," where they are joined and securely fastened to the yoke "$m$" that straddles the yoke $m'$. This now becomes a rigid unit, that may be rotated a certain degree, forward and back in the main body "g." This rotation is controlled by a hydraulic cylinder "h," and piston, with the cylinder "h," mounted on a pivot fixed to the main body "g." The piston shaft end is pivotally secured to the yoke "$m$." Hydraulically extending and retracting the piston, will rotate the yoke "$m$," housings $c$–$c'$ and rotors Z–Z', as a unit, back and forward, as shown in FIG. 5 for housings $a$–$a'$, view F.

The drive train, from the main motor shaft gear, is identical for all rotors, with the exception of the individual rotor shaft gears, wherein the meshed position, above or below, the horizontal shaft gear, determines the direction of rotation of the individual rotors. The direction of rotation of the diagonal rotors are opposite to cancel torque moment. Therefore being identical one description will suffice for all. A horizontal shaft extends through the rotor pivot housing and is rotatably mounted therein, on each end of the shaft, there is securely fastened a gear, the inboard gear meshes with the central motor drive gear and the outboard gear meshes with a gear that is securely fastened to the rotor shaft, this shaft in turn is rotatably mounted in the rotor pivot housing, and on this shaft is securely fastened the rotor with fixed blades. It may be noted, that a movement of the rotor pivot housing with horizontal shaft gears stationary will rotate the rotor.

In the operation of the four rotor vertical lift aircraft as described, the pilot has two flight controls ($n$ and $n'$) that are movable, forward and back, from a neutral position. Each flight control is independently connected, by hydraulic means not shown, or by mechanical or electric means, to one of the hydraulic cylinders $h$, $h'$, and thus to the rotor pivot housing connecting yoke bars ($m$ or $m'$). This will control the angular position of the rotors, forward or back, from the neutral vertical lift and descend position. Each flight control ($n$ and $n'$) positions one of the rotor units, one unit consisting of two rotors ($x$ and $x'$), two rotor pivot housings ($a$ and $a'$), and one connecting yoke bar ($m'$), the other unit consisting of two rotors ($z$ and $z'$), two rotor pivot housings ($c$ and $c'$), and one connecting yoke bar ($m$). Each unit may be equipped with other parts as necessary.

On takeoff, the flight controls ($n$ and $n'$) are set at neutral. This sets all rotors in a horizontal plane, to provide vertical lift or descent. Motor (T) is started and rotor r.p.m.'s are increased to the necessary r.p.m. to lift the aircraft vertically. When the aircraft is airborne, the pilot may elect to engage the clutch which drives and rotates the rudder or spin vane (Q), shown in neutral position in FIG. 2. This will create torque and spin the aircraft until the approximate flight direction is obtained. At this time the flight controls ($n$ and $n'$), are moved from a neutral to a synchronized forward position. This sets all rotors at a common angular forward position from the horizontal plane which propels the aircraft forward. The pilot then disengages the spin vane drive clutch, and spin vane (Q) rotates free and stops in a normal forward flight position. At this time the pilot may engage the manual rudder or vane control (w) which was in the locked out position and was freely rotating when the spin clutch was in engagement. This will allow the pilot to hold or change the forward flight course. To alter forward or backward flight direction, the pilot displaces flight controls (n and n') forward and back, or back and forward. This will cause the aircraft to veer, either to the right or left. The pilot may then synchronize controls (n and n') again and the aircraft will resume normal forward or backward flight. Maximum forward or backward flight veer will occur when one flight control is in neutral and the other flight control is in either forward or back position. This sets one rotor unit in a neutral horizontal plane position and one rotor unit at an angular forward or back position. To brake and move the aircraft backward, the pilot synchronizes and then pulls both flight controls (n and n') back beyond the neutral position. This sets all rotors at a common angular back position from the horizontal plane. Due to the positioning and pivoting of rotors, normal forward and backward flight is achieved through resultant thrust from the two forward and the two rear rotors. The pilot may land the aircraft by moving flight controls (n and n') to the neutral position, this positions all rotors in a horizontal plane. To spin the aircraft for a desired landing position, the pilot will lock out the manual rudder and vane control (w) and engage the clutch to rotate rudder or vane (Q) until the desired aircraft landing position is obtained. The pilot then disengages the spin clutch. By retarding the throttle, all rotor r.p.m.'s are decreased to the necessary r.p.m. to land the aircraft. In the event of a motor failure, the drive clutch is disengaged to permit free wheeling of all rotors.

In accordance with the above and to further clarify the invention, it should be noted that with the rotor units positioned for vertical lift and rotors revolving and with fixed pitch rotor blades the thrust is equal for all rotors and vertical; thus with uniform increased r.p.m. of the rotors the aircraft rises vertically. By the diagonal arrangement of the rotor units and pivoting of the same, forward or back, from the vertical lift and descend position, and by independent control of the pivoting of each rotor unit, control of directional thrust resulting from the angular change in position of the rotors is accomplished.

Forward flight in relation to the pilot is the resultant of equal thrust from the angular uniform tilt forward of all rotors. Backward flight in relation to the pilot is the resultant of equal thrust from the uniform angular tilt back of all rotors.

Sidewise flight left or right in relation to the pilot is the resultant of equal thrust from the uniform angular tilt of all rotors in the left or right direction.

The foregoing disclosure and description of the invention is illustrative and explanatory. Various modifications and improvements as well as changes in mode of operation and manner of use may occur to those skilled in the art without departing from the spirit of the invention or from the scope of the appended claim.

What is claimed is:

A rotary wing aircraft comprising; a body portion including a circular fuselage; a drive motor centrally mounted in said fuselage including a drive shaft having vertically upwardly and vertically downwardly oriented portions extending outwardly from the ends of said motor; two composite housing units positioned cross-wise and mounted for independent rotation in the top of said fuselage; each said housing unit including two horizontally aligned shaft housings, each said shaft housing extending outwardly from the center of said fuselage, a yoke rigidly connected to said two shaft housings at the inner portions thereof, a vertically oriented lift-producing rotor having fixed pitch rotor blades rotatably mounted at the outer portion of each of said two shaft housings, actuating means operatively connected to said yoke for simultaneously rotating said yoke, said two shaft housings and said lift-producing rotors as a composite housing unit about the longitudinal axes of said horizontally aligned shaft housings; said rotors being operatively connected to said upwardly extending portion of said drive shaft; control means operatively connected to each of said actuating means for effecting rotation of said housing units to thereby control the direction of resultant lift produced by said lift-producing rotors; a rudder rotatably mounted on the lower portion of said fuselage; clutch means connecting said rudder to said downwardly extending portion of said drive shaft, whereby said rudder may be operatively connected to said motor for rotation as a torque producing spin vane to thereby provide a means of yaw control during hovering flight operation of said aircraft; and disengageable steering means connected to said rudder for controlling said rudder as a conventional aerodynamic control surface when said rudder is not operatively connected to said motor for rotation as a torque producing spin vane.

References Cited by the Examiner

UNITED STATES PATENTS

| | | | |
|---|---|---|---|
| 1,042,758 | 10/12 | Bissell | 244—17.21 |
| 1,351,821 | 9/20 | Wilkinson | 244—17.23 X |
| 1,551,834 | 9/25 | Monsen | 244—17.19 |
| 2,939,654 | 6/60 | Coanda. | |
| 2,981,501 | 4/61 | Schaefer | 244—23 X |
| 2,987,272 | 6/61 | Vogt | 244—17.23 |
| 3,008,524 | 11/61 | Kaplan | 244—17.23 X |
| 3,053,480 | 9/62 | Vanderlip | 244—17.13 |

FOREIGN PATENTS 405,049   10/24   Germany.

FERGUS S. MIDDLETON, *Primary Examiner.*